US007361210B2

(12) United States Patent
Olsen

(10) Patent No.: US 7,361,210 B2
(45) Date of Patent: Apr. 22, 2008

(54) METHODS AND APPARATUSES FOR SEPARATING FROTH

(76) Inventor: David N. Olsen, 1000 NE., Circle Blvd., Corvallis, OR (US) 97330-4239

( * ) Notice: Subject to any disclaimer, the term of this patent is extended or adjusted under 35 U.S.C. 154(b) by 448 days.

(21) Appl. No.: 11/112,201

(22) Filed: Apr. 22, 2005

(65) Prior Publication Data

US 2006/0236866 A1 Oct. 26, 2006

(51) Int. Cl.
*B01D 19/00* (2006.01)

(52) U.S. Cl. ....................... 95/242; 95/2; 95/24; 95/57; 96/176; 96/15; 96/18; 347/92

(58) Field of Classification Search .................. 95/242, 95/57, 2, 24; 96/176, 15, 18; 347/92
See application file for complete search history.

(56) References Cited

U.S. PATENT DOCUMENTS 2,240,495 A * 5/1941 Dillon et al. .................. 96/88
2,381,578 A * 8/1945 Dillon et al. .................. 95/57
2,450,016 A * 9/1948 Isadore .......................... 96/88
2002/0029690 A1 3/2002 Ridgeway

FOREIGN PATENT DOCUMENTS

DE 19639204 3/1998
EP 0613724 9/1994

OTHER PUBLICATIONS

International Search Report for Application No. PCT/US2006/015186. Report issued Aug. 31, 2006.

* cited by examiner

*Primary Examiner*—Duane Smith
*Assistant Examiner*—Douglas J. Theisen

(57) ABSTRACT

Methods and apparatuses are provided for separating froth into liquid and gas components. One apparatus includes a container that is configured to hold froth therein and change at least a portion of the froth into substantially separate liquid and gas portions when an electrostatic charge is discharged through at least a portion of the froth between at least two electrodes at least partially arranged within the container.

36 Claims, 3 Drawing Sheets

METHODS AND APPARATUSES FOR SEPARATING FROTH

BACKGROUND

Certain devices that move or otherwise handle liquid(s) may produce froth. Froth, for example, can occur when the liquid(s) mix with gas to form bubbles. A build-up of such bubbles can lead to a layer of froth on top of the liquid. In certain instances gas maybe drawn into the liquid resulting in froth. In other instances gas may be drawn or otherwise released from within the liquid resulting in froth.

Froth will usually return to separate liquid and gas components, but this can take a significant amount of time and possibly also space to hold the froth as it slowly separates. Such time and or space are often unacceptable for certain devices or processes. Thus, to avoid froth or otherwise reduce the volume of froth produced, special chemicals or compounds are often added to the liquid that tend to reduce or eliminate unwanted froth.

However, there are some devices and processes that simply cannot accommodate such special chemicals or compounds. In other situations, the additional cost of such special chemicals or compounds may be prohibitive.

Consequently, there is a need for methods and apparatuses for handling froth.

BRIEF DESCRIPTION OF THE DRAWINGS

The following detailed description refers to the accompanying figures.

DETAILED DESCRIPTION

Figure 1A:
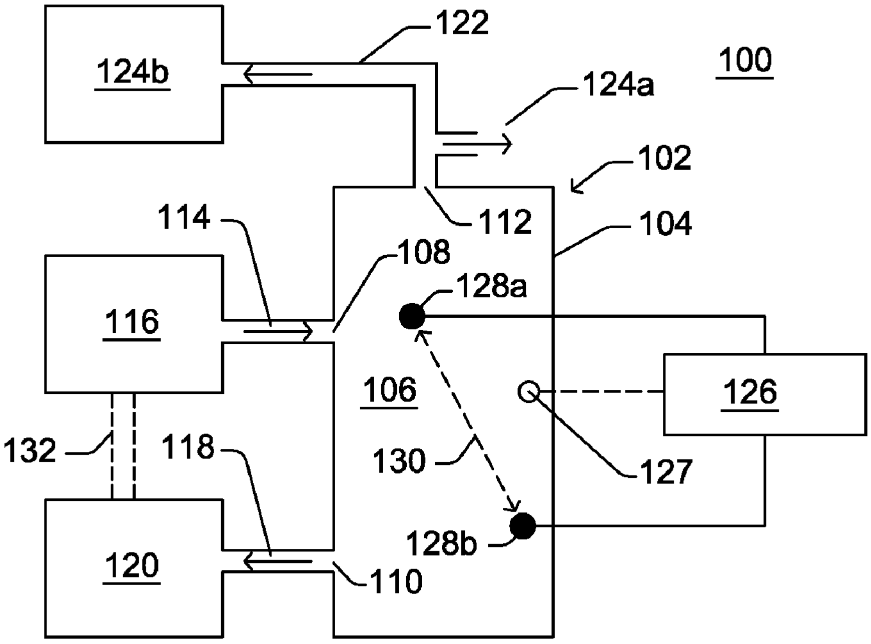
FIG. 1A is an illustrative diagram depicting an exemplary fluid handling device having a container configured to handle froth in accordance with certain implementations of the present invention.

Attention is drawn to FIG. 1A, which is an illustrative diagram depicting an exemplary fluid handling device 100 having a container 102 configured to handle froth in accordance with certain implementations of the present invention.

As shown, fluid handling device 100 includes container 102 having, in this example, a housing 104 forming therein an opening 106 which is suitable for holding froth. Here, froth is introduced into opening 106 through a froth port 108. Opening 106 further includes a liquid port 110 that allows liquid separated from the froth within opening 106 to exit container 102. Opening 106 also includes a gas port 112 that allows gas separated from the froth within opening 106 to exit container 102.

In this embodiment, froth port 108 is fluidically coupled to a froth conduit 114 which is further fluidically coupled to a froth source 116. Similarly, liquid port 110 is fluidically coupled to a liquid conduit 118 which is further fluidically coupled to a liquid destination 120.

In certain other implementations, all or some of the froth and liquid components may be combined. For example, froth port 108 and liquid port 110 may be combined into a single port that allows froth to enter into opening 106 and liquid to exit from within opening 106. Froth conduit 114 and liquid conduit 118 may be similarly combined into one conduit that carries froth towards container 102 and liquid away from container 102. In such examples and/or other implementations, froth source 116 and liquid destination 120 may also be combined as a single container or vessel that is configured to hold both liquid and froth. Such combinations are represented by connector 132 shown in dashed line format.

With regard to the exemplary device in FIG. 1A, a gas conduit 122 is fluidically coupled to gas port 112. Here, gas may exit opening 106 and be released (e.g., vented) into the atmosphere as illustrated as gas destination 124*a* and/or collected or otherwise handled using a gas destination 124*b* fluidically coupled to gas port 112. In certain implementations, gas port 112 may directly vent gas into the atmosphere without requiring gas conduit 122. Gas port 112, gas conduit 122 and/or gas destination 124*b* may be configured to reduce the chance for liquid or froth from escaping therethrough by including one or more controlling mechanisms as are well known in the art for reducing fluid leaks and the like. For example, in certain implementations, a gas-permeable filter (not shown) and/or a serpentine conduit shape (not shown) may be employed to hinder liquid movement.

Circuitry 126 is shown as being connected to at least two electrodes that are at least partially arranged within opening 106. In this example, circuitry 126 is configured to generate a voltage potential between an upper electrode 128*a* and a lower electrode 128*b*, which are separated by a gap space 130 within opening 106. When applied by circuitry 126, the voltage potential creates an electrostatic charge between the electrodes. This electrostatic charge is discharged through the froth located within opening 106. The electrostatic discharge tends to reduce the amount of froth.

The reduction of froth is believed to be caused by the electrostatic discharge creating localized heating of the bubble lamella, disrupting the surface tension and causing the bubble to rupture. The high temperature of the spark vaporizes the liquid faster than the surface tension can recover destabilizing the lamella.

Those skilled in the art will recognize that circuitry 126 may take on several forms, as there are many well known circuits that may be employed to generate the voltage potential.

Figure 4:
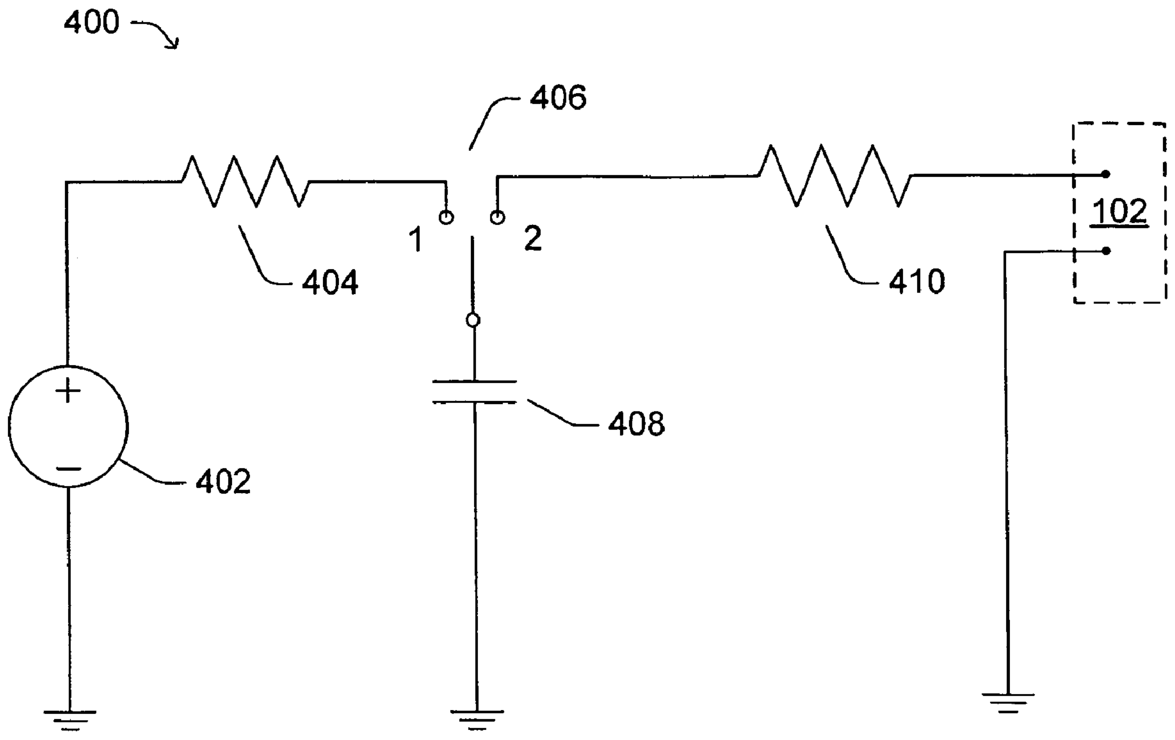
FIG. 4 is a diagram depicting exemplary circuitry for applying an electrostatic charge, in accordance with certain implementations of the present invention.

By way of example, a simple charging/discharging circuit 400 is illustrated in FIG. 4. Circuit 400 may be included, for example, in circuitry 126. Circuit 400 includes a DC voltage source 402 coupled to a charging resistor 404. Charging resistor 404 is further coupled to a relay 406. When relay 406 is in a first position the voltage potential from source 402 is applied to charge storage capacitor 408. Capacitor 408 is then charged. Subsequently, when relay 406 is in a second position the capacitor 408 is allowed to discharge through a current limiting resistor 410 and through froth between the electrodes in container 102. In one exemplary implementation, DC voltage source 402 outputs 8,000 volts, charging resistor 404 is a 1 MΩ resistor, charge storage capacitor 408 is a 100 pF capacitor, current limiting resistor is a 1 kΩ resistor, and the resulting electrostatic discharge is about 8,000 volts.

Furthermore, those skilled in the art will recognize that the voltage potential will likely be different depending upon various design characteristics and the like. For example, the voltage potential may correspond in some manner to the arranged opening 106, electrodes 128, the gap space 130 (or gap spaces if more than two electrodes are used), certain properties or characteristics of the liquid and/or the gas, the amount of froth present or expected, etc. By way of example, in certain implementations a voltage potential of at least about 1,000 volts may be required, while in other implementations the requisite voltage potential may be lower or greater. In certain exemplary implementations such as that depicted in FIG. 2, for example, the voltage potential is typically between about 8,000 and about 12,000 volts.

In certain implementations, circuitry 126 is configured to selectively apply the voltage potential when the volume of froth within opening 106 reaches or possibly exceeds a defined threshold froth volume level. Hence, circuitry 126 may include a monitoring mechanism 127 that senses the froth volume level or otherwise identifies the froth volume level in a manner that causes circuitry 126 to apply the voltage potential. Monitoring mechanism 127 may include, for example, electrical, mechanical, and/or optical based sensors or other like devices. Circuitry 126 may include logic and/or other mechanisms to respond to monitoring mechanism 127. In certain implementations, circuitry 126 may be programmably configured and the threshold froth volume level(s) established.

In certain implementations, circuitry 126 may be configured to apply the voltage potential periodically, perhaps in accordance with a desired schedule. For example, the voltage potential may be applied every ten seconds.

Circuitry 126 may be configured to apply the voltage potential a plurality of times during a set period of time. For example, the voltage potential may be applied at a rate of once per second (i.e., 1 Hz). Such a rate may be higher or lower in other implementations. For example, a rate of about 20 Hz was found to be effective in certain implementations as for example in FIG. 2.

Those skilled in the art will recognize also that circuitry 126 may be configured to apply different voltages at certain times, or upon different levels of froth, or through different electrodes, etc.

Figure 1B:
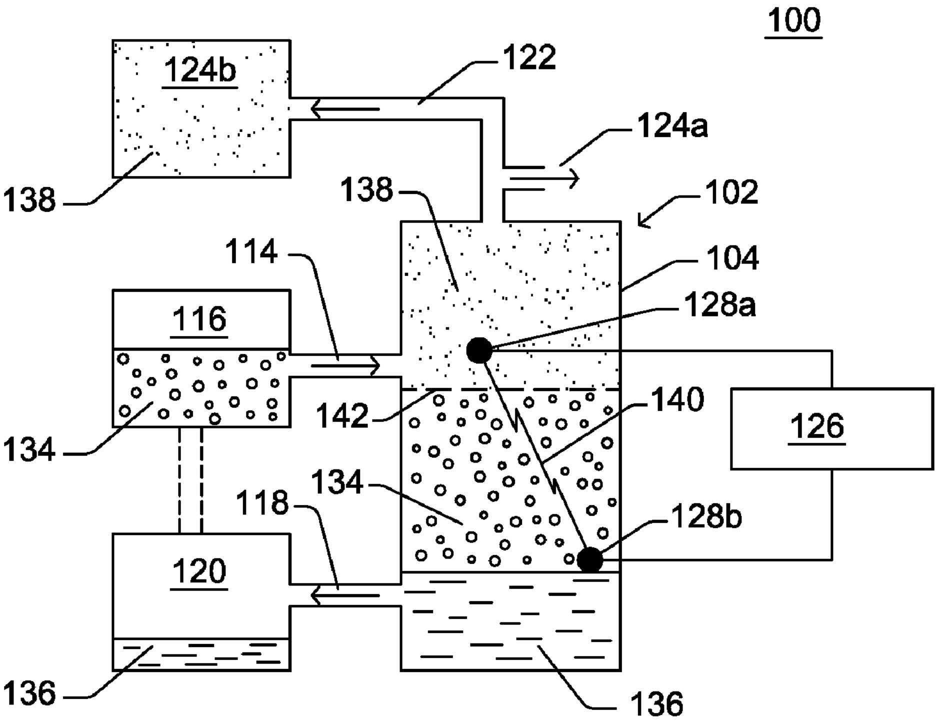
FIG. 1B is an illustrative diagram depicting an exemplary fluid handling device having a container configured to handle froth as in FIG. 1A further illustrating froth, and froth that has been separated into liquid and gas portions, in accordance with certain implementations of the present invention.

Attention is now drawn to FIG. 1B. Here, froth 134 is urged or otherwise allowed in some manner to travel from froth source 116 through froth conduit 114 and into opening 106. An electrostatic discharge is illustrated by conductive path(s) 140 as passing between electrodes 128*a* and 128*b* through portions of froth 134. The electrostatic discharge tends to separate at least some of froth 134 into liquid 136 and gas 138 portions. In this example, the separated liquid 136 descends within opening 106 following the electrostatic discharge where it may then be urged or otherwise allowed in some manner to travel from opening 106 through liquid conduit 118 and into liquid destination 120. The separated gas 138 ascends within opening 106, above any remaining froth 134 and/or liquid 136, where it may then be urged or otherwise allowed in some manner to travel from opening 106 through gas conduit 122 and into a gas destination 124*a* and/or 124*b*.

A threshold froth volume level 142 is illustrated in FIG. 1B. As described above, in certain implementations, circuitry 126 may be configured to selectively apply the voltage potential provided that the froth volume level is at or above threshold froth volume level 142. In other implementations, threshold froth volume level 142 may reflect the level at which there is simply enough froth 134 between electrodes 128*a-b* to cause the discharge via conductive path 140.

Figure 2:
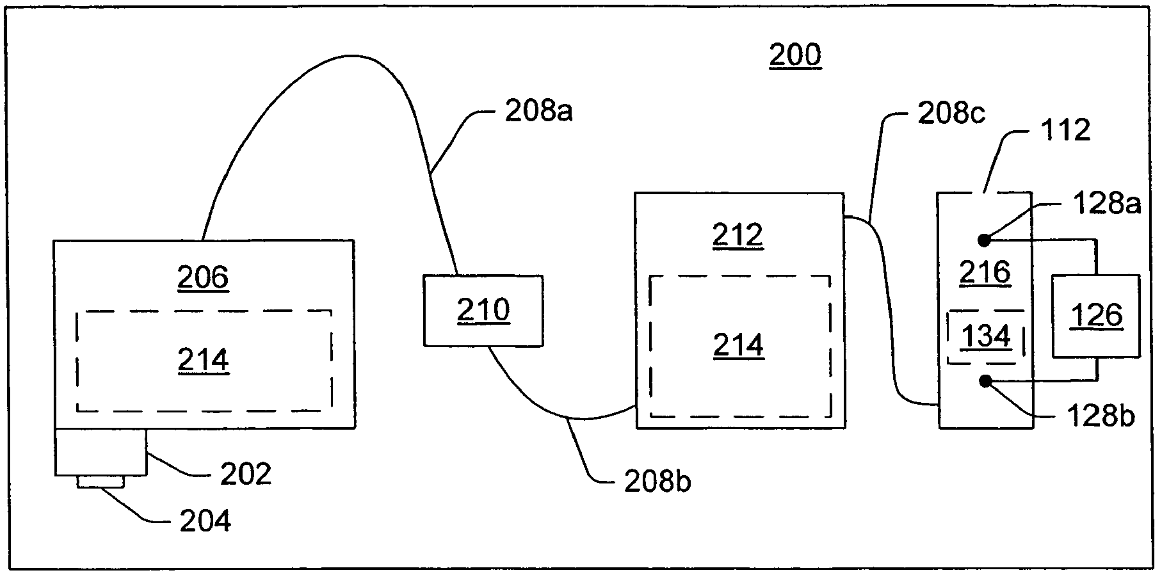
FIG. 2 is an illustrative diagram depicting an exemplary printing device having a container configured to handle froth, in accordance with certain implementations of the present invention.

FIG. 2 is an illustrative diagram depicting an exemplary printing device 200 having a container 216 configured to handle froth, in accordance with certain further implementations of the present invention.

Printing device 200 is a representative inkjet printing device. Printing device 200 includes a printhead 202 having one or more nozzles 204 configured to selectively eject droplets of fluid, such as for example, ink 214. Printhead 202 is fluidically coupled to a printhead reservoir 206 that holds and supplies ink 214 to printhead 202. Printhead reservoir 206 is further fluidically coupled through a conduit 208*a* to a pump 210. In this example pump 210 is a bidirectional pump and is further fluidically coupled to an ink cartridge 212 through a conduit 208*b*. Ink cartridge 212 stores ink 214. Pump 210 may be operated to selectively pump ink 214 from ink cartridge 212 to printhead reservoir 206, or from printhead reservoir 206 to ink cartridge 212. Froth may be created due to this pumping action and/or as a result of some other process or property. Thus, froth may accumulate in ink cartridge 212.

The froth in ink cartridge 212 is allowed to enter into container 216 via conduit 208*c*. Froth 134 within container 216 is then subjected to an electrostatic discharge and the separated ink is allowed to return to container 216 via conduit 208*c*. The separated gas is allowed to exit container 216 via gas port 112.

Although shown separately, in certain other implementations, ink cartridge 212 and container 216 may be combined to form a single vessel. Similarly, in still other implementations, ink cartridge 212, container 216 and printhead reservoir 206 may be combined to form a single vessel.

Figure 3:
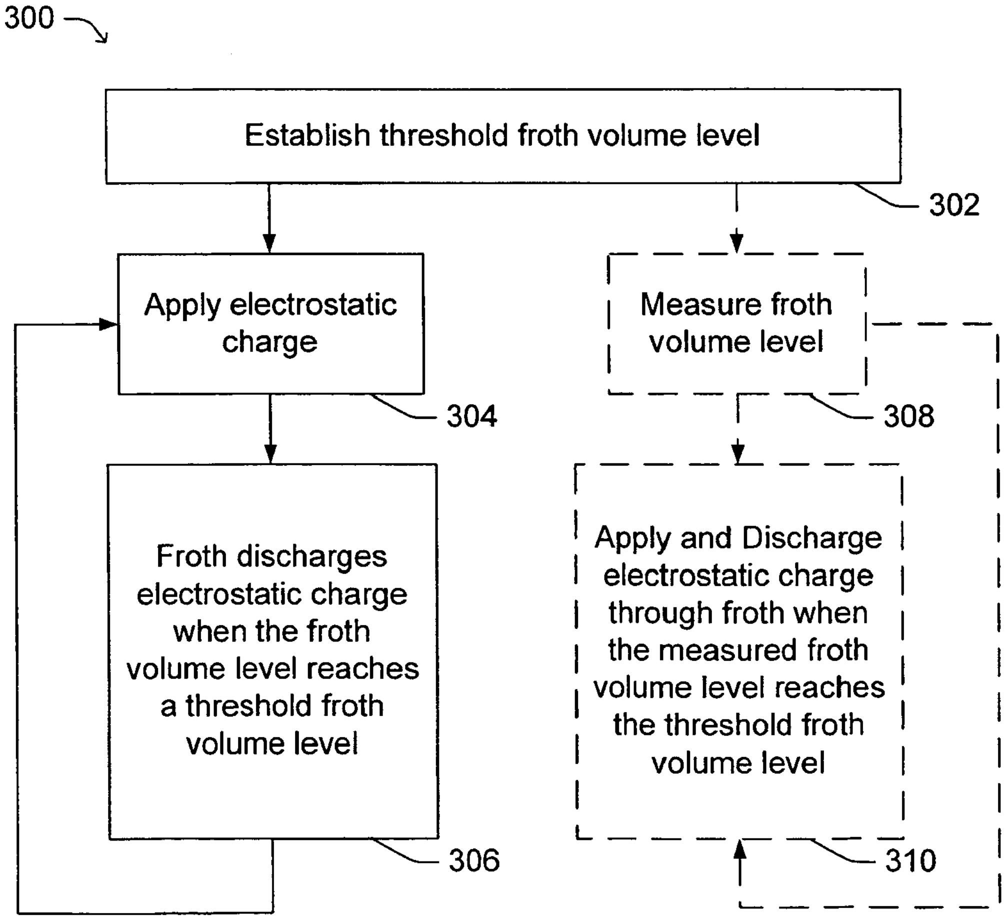
FIG. 3 is flow diagram depicting a method for use with devices, for example, such as those illustrated in FIGS. 1A-B, and 2, for handling froth, in accordance with certain implementations of the present invention.

FIG. 3 is flow diagram depicting a method 300 for use with fluid handling devices, for example, such as those illustrated in FIGS. 1 and 2, for handling froth, in accordance with certain implementations of the present invention.

In act 302 a threshold froth volume level 142 is established, for example, as described in the examples above or in other ways. In act 304 an electrostatic charge is applied by circuitry 126 to electrodes 128. In act 306 the froth discharges the electrostatic charge when the froth reaches the threshold froth volume level 142. Acts 304 and 306 may then be repeated.

In a second exemplary method, as depicted with dashed lines in FIG. 3, in act 308 the froth volume level may be measured. In act 310, when the measured froth volume level reaches the threshold froth volume level 142, circuitry 126 applies the electrostatic charge that then discharges through froth 134. Acts 308 and 310 may then be repeated.

Although the above disclosure has been described in language specific to structural/functional features and/or methodological acts, it is to be understood that the appended claims are not limited to the specific features or acts described. Rather, the specific features and acts are exemplary forms of implementing this disclosure.

What is claimed is:

1. A method for separating froth, the method comprising:
collecting froth within a container; and
discharging an electrostatic charge within said container through at least a portion of said froth.

2. The method as recited in claim 1, wherein said froth includes a mixture of at least one liquid and at least one gas and at least one of said liquid and gas provides a conductive path for said electrostatic charge during discharge.

3. The method as recited in claim 1, wherein discharging said electrostatic charge further includes:

discharging said electrostatic charge between at least two electrodes separated by a gap space within said container.

4. The method as recited in claim 3, wherein discharging said electrostatic charge occurs when a froth volume within at least said gap space within said container reaches a threshold volume level.

5. The method as recited in claim 4, wherein said threshold volume level is met when said froth volume allows said froth to conduct said electrostatic charge.

6. The method as recited in claim 4, further comprising:

establishing said threshold volume level;

measuring said froth volume; and applying said electrostatic charge to at least one of said electrodes when said measured froth volume meets or exceeds said established threshold volume level.

7. The method as recited in claim 4, further comprising:

not discharging said electrostatic charge when said froth volume within at least said gap space within said container is below said threshold volume level.

8. The method as recited in claim 3, further comprising:

at least partially discharging said electrostatic charge through at least a portion of said froth located within said gap space between said electrodes.

9. The method as recited in claim 3, further comprising:

generating said electrostatic charge; and applying said electrostatic charge to at least one of said electrodes.

10. The method as recited in claim 1, wherein said electrostatic charge provides a voltage potential between said electrodes of at least about 1,000 volts.

11. The method as recited in claim 10, wherein said voltage potential is between 8,000 volts and 12,000 volts.

12. The method as recited in claim 1, further comprising: periodically discharging said electrostatic charge.

13. The method as recited in claim 12, wherein periodically discharging said electrostatic charge further includes:

sequentially discharging a plurality of electrostatic charges during a defined period of time.

14. The method as recited in claim 13, wherein said plurality of electrostatic charges is sequentially discharged at a rate of at least 1 Hertz.

15. The method as recited in claim 13, wherein said plurality of electrostatic charges is sequentially discharged at a rate of at least 20 Hertz.

16. The method as recited in claim 1, wherein said container is part of a printing device and is configured to receive said froth that includes liquid ink mixed with gas.

17. The method as recited in claim 16 wherein said container is further configured to hold at least said liquid ink substantially separated from said gas after discharging said electrostatic charge through at least said portion of said froth.

18. The method as recited in claim 16 wherein said container is further configured to output at least said liquid ink substantially separated from said gas after discharging said electrostatic charge through at least said portion of said froth.

19. An apparatus comprising:

a container configured to hold froth therein and change at least a portion of said froth into substantially separate liquid and gas portions when an electrostatic charge is discharged through at least a portion of said froth between at least two electrodes at least partially arranged within said container.

20. The apparatus as recited in claim 19, said container further comprising a housing forming an opening therein, said opening being configured to hold said froth, wherein said at least two electrodes are at least partially exposed within said opening and configured to discharge said electrostatic charge there between and through at least a portion of said froth when present within said opening, and said apparatus further comprising circuitry operatively coupled to each of said electrodes and configured to generate and apply said electrostatic charge between said electrodes.

21. The apparatus as recited in claim 20, wherein at least one of said liquid portion and gas portion is conductive, wherein said at least one conductive portion provides a conductive path for said electrostatic charge during discharge.

22. The apparatus as recited in claim 20, wherein said at least two electrodes are separated by a gap space within said opening.

23. The apparatus as recited in claim 22, wherein said circuitry is configured so that said electrostatic charge is discharged when a froth volume within at least said gap space reaches a threshold volume level.

24. The apparatus as recited in claim 23, wherein said circuitry configured so that said electrostatic charge is discharged when a froth volume within at least said gap space reaches a threshold volume level comprises circuitry configured so that said electrostatic charge is discharged when a froth volume within at least said gap space is sufficient to conduct said electrostatic charge.

25. The apparatus as recited in claim 23, wherein said circuitry is further configured to establish said threshold volume level, measure said froth volume, and apply said electrostatic charge to at least one of said electrodes when said measured froth volume meets or exceeds said established threshold volume level.

26. The apparatus as recited in claim 23, wherein said circuitry is further configured to not apply said electrostatic charge to at least one of said electrodes when said froth volume within at least said gap space is below said threshold volume level.

27. The apparatus as recited in claim 22, wherein said circuitry is configured so that said electrostatic charge is at least partially discharged through at least a portion of said froth located within said gap space between said electrodes.

28. The apparatus as recited in claim 20, wherein said circuitry is configured to apply a voltage potential between said electrodes of at least about 1,000 volts.

29. The apparatus as recited in claim 28, wherein said circuitry is configured to apply a voltage potential between said electrodes of between about 8,000 volts and about 12,000 volts.

30. The apparatus as recited in claim 20, wherein said circuitry is configured to periodically apply a voltage potential between said electrodes.

31. The apparatus as recited in claim 30, wherein said circuitry is configured to sequentially apply a plurality of voltage potentials between said electrodes during a defined period of time.

32. The apparatus as recited in claim 31, wherein said circuitry is configured to sequentially apply said plurality of voltage potentials at a rate of at least about 1 Hertz.

33. The apparatus as recited in claim 31, wherein said circuitry is configured so that said plurality of voltage potentials is sequentially discharged at a rate of at least about 20 Hertz.

34. The apparatus as recited in claim 19, wherein said container is part of a printing device and is configured to receive said froth that includes liquid ink mixed with gas.

35. The apparatus as recited in claim 34, wherein said container is further configured to hold at least said liquid ink substantially separated from said gas after discharging said electrostatic charge through at least said portion of said froth.

36. The apparatus as recited in claim 34, wherein said container is further configured to output at least said liquid ink substantially separated from said gas after discharging said electrostatic charge through at least said portion of said froth.

* * * * *